United States Patent Office 3,036,136
Patented May 22, 1962

3,036,136
CYCLOPENTADIENE DERIVATIVES
Thomas Leigh, Macclesfield, England, assignor to Imperial Chemical Industries Limited, London, England, a corporation of Great Britain
No Drawing. Filed Nov. 12, 1959, Ser. No. 852,182
Claims priority, application Great Britain Dec. 17, 1958
8 Claims. (Cl. 260—666)

This invention relates to organic compounds and more particularly it relates to cyclopentadiene derivatives which are valuable as intermediate products.

According to the invention we provide cyclopentadiene derivatives of the formula

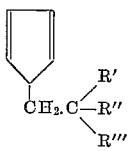

wherein R' stands for hydrogen or an alkyl radical, and R" and R'" which may be the same or different, stand for alkyl radicals.

A valuable compound of the above stated formula is neopentylcyclopentadiene.

According to a further feature of the invention we provide a process for the manufacture of the said cyclopentadiene derivatives which comprises interaction of a compound of the formula:

wherein R stands for an alkyl radical, and a compound of the formula:

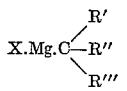

wherein X stands for a halogen atom, and R', R" and R'" have the meaning stated above.

As suitable starting materials to be used in the said process there may be mentioned, for example, methoxymethylcyclopentadiene, ethoxymethylcyclopentadiene or n-butoxymethylcyclopentadiene, and a tert.-butyl magnesium halide, for example tert.-butyl magnesium chloride.

The said process is conveniently carried out in the presence of an inert diluent or solvent, for example diethyl ether, preferably at a temperature of about 20–30° C.

As said, the cyclopentadiene derivatives of the invention are valuable as intermediates. Thus they are valuable as intermediates in the manufacture of ferrocene derivatives, for example 1,1'-dineopentylferrocene, which possess haematinic activity.

The invention is illustrated but not limited by the following examples in which the parts are by weight:

*Example 1*

To a stirred suspension of 12 parts of magnesium powder in 15 parts of diethyl ether at 30° C. is added 0.2 part of iodine. A solution of 46 parts of tert.-butylchloride in 90 parts of diethyl ether is then added to the said stirred suspension during 3 hours. To the resulting mixture (which by analysis contains approximately 40 parts of tert.-butyl magnesium chloride) is added 29 parts parts of ethoxymethylcyclopentadiene at a temperature of 25° C., and this temperature is maintained for a further 2 hours. The reaction mixture is then poured on to ice and the ethereal solution is separated and washed with water and dried over sodium sulphate. The solvent is removed at 25° C. under reduced pressure and the residue is distilled. There is thus obtained neopentylcyclopentadiene, B.P. 38° C./7.0 mm.

*Example 2*

The process described in Example 1 is repeated except that the 29 parts of ethoxymethylcyclopentadiene are replaced by 35 parts of n-butoxymethylcyclopentadiene. There is thus obtained in a similar manner neopentylcyclopentadiene, B.P. 38° C./7.0 mm.

*Example 3*

The process described in Example 1 is repeated except that the 29 parts of ethoxymethylcyclopentadiene are replaced by 27 parts of methoxymethylcyclopentadiene. There is thus obtained in a similar manner neopentylcyclopentadiene, B.P. 38° C./7.0 mm.

What I claim is:
1. Cyclopentadiene derivatives of the formula:

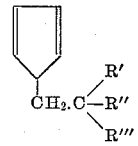

wherein R' stands for a member of the group consisting of hydrogen and a lower alkyl radical, and R" and R'" stand for lower alkyl radicals.

2. The compound neopentylcyclopentadiene.
3. A process for the manufacture of the cyclopentadiene derivatives claimed in claim 1 which comprises interaction of a compound of the formula:

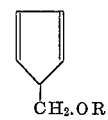

wherein R stands for a lower alkyl radical and a compound of the formula:

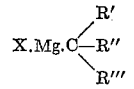

wherein X stands for a halogen atom, and R', R" and R'" have the meaning stated above.

4. A process as claimed in claim 3 wherein the starting materials are selected from the group consisting of methoxymethylcyclopentadiene, ethoxymethylcyclopentadiene and n - butoxymethylcyclopentadiene, and a tert.-butyl magnesium halide.

5. A process as claimed in claim 4 wherein the tert.-butyl magnesium halide is tert.-butyl magnesium chloride.

6. A process as claimed in claim 3 which is carried out in the presence of an inert liquid medium.

7. A process as claimed in claim 6 wherein the inert liquid medium is diethyl ether.

8. A process as claimed in claim 3 which is carried out at a temperature between 20° C. and 30° C.

References Cited in the file of this patent

"Unformugen des Cyclopentadiens," Braun et al. Berichte, vol. 70, 1937, pages 1750 to 1756.

"Grignard Reactions of Non-Metallic Substances," Kharasch and Reinmuth, Prentice-Hall Inc., 1954, page 1015.

Coates: Organo-Metallic Compounds, John Wiley & Sons, Inc., New York, 1960 (page 235).